US007542989B2

(12) United States Patent
Rudner

(10) Patent No.: US 7,542,989 B2
(45) Date of Patent: Jun. 2, 2009

(54) METHOD AND SYSTEM FOR SEARCHING, IDENTIFYING, AND DOCUMENTING INFRINGEMENTS ON COPYRIGHTED INFORMATION

(75) Inventor: Lawrence Rudner, McLean, VA (US)

(73) Assignee: Graduate Management Admission Council, McLean, VA (US)

( * ) Notice: Subject to any disclaimer, the term of this patent is extended or adjusted under 35 U.S.C. 154(b) by 236 days.

(21) Appl. No.: 11/338,689

(22) Filed: Jan. 25, 2006

(65) Prior Publication Data

US 2007/0174327 A1    Jul. 26, 2007

(51) Int. Cl.
G06F 17/00    (2006.01)
G06F 15/16    (2006.01)
(52) U.S. Cl. .......................................... 707/102; 707/3
(58) Field of Classification Search .................. 707/102
See application file for complete search history.

(56) References Cited

U.S. PATENT DOCUMENTS

| 6,119,124 | A  | * | 9/2000 | Broder et al. ........... 707/103 R |
| 6,240,409 | B1 | * | 5/2001 | Aiken ............................. 707/4 |
| 6,263,348 | B1 | * | 7/2001 | Kathrow et al. ............. 707/203 |
| 6,658,423 | B1 | * | 12/2003 | Pugh et al. .................. 707/102 |
| 6,978,419 | B1 | * | 12/2005 | Kantrowitz ................. 715/209 |
| 7,139,756 | B2 | * | 11/2006 | Cooper et al. .................. 707/6 |
| 7,181,158 | B2 | * | 2/2007 | Heller et al. ................ 434/362 |
| 7,219,301 | B2 | * | 5/2007 | Barrie et al. ................ 715/751 |
| 2004/0030691 | A1 | * | 2/2004 | Woo .............................. 707/3 |
| 2004/0049571 | A1 | * | 3/2004 | Johnson et al. ............. 709/224 |
| 2004/0076941 | A1 | * | 4/2004 | Cunningham et al. ........ 434/350 |

OTHER PUBLICATIONS

Shivakumar et al., "SCAM: A Copy Detection Mechanism for Digital Documents" (pub. after 1995) Stanford University, Stanford, CA, pp. 1-12.*
Shivakumar et al., "Building a Scalable and Accurate Copy Detection Mechanism" (1996) Stanford University, Stanford, CA, pp. 1-8.*
Mee et al., "Detecting and Tracing Copyright Infringments in P2P Networks" (2006) Macquarie University, Australia, pp. 1-6.*

* cited by examiner

Primary Examiner—Tony Mahmoudi
Assistant Examiner—Jensen Hu
(74) Attorney, Agent, or Firm—Panitch Schwarze Belisario & Nadel LLP

(57) ABSTRACT

A method is provided for identifying unauthorized use of copyrighted information. The method includes the processes of accessing a database of copyrighted information, accessing information used for searching the copyrighted information, optionally accessing contextual information concerning the copyrighted materials, accessing a set of materials suspect of infringing on the copyrighted information, receiving an input corresponding to the type of search to be conducted, and receiving a second input corresponding to a class of copyrighted information with respect to the search function. In addition, the method includes the processes of determining a result when data within the database of copyrighted information and a file of infringement suspects satisfies a predetermined set of logic, of determining a result when data within the database of copyrighted information and an input formatted text string satisfies a predetermined set of logic, and storing and presenting the results.

13 Claims, 4 Drawing Sheets

Communication Network System
30

FIG. 3

GMAT® Item Find v8.5

540,218 comparisons in 2.438 sec.    25 hits in 47 tested items.

| Item ID | Accession 1 | Accession 2 | Accession 3 |
|---|---|---|---|
| 8TaishaV13 | JT001051 | | |
| 10TaishaV13 | OJ002101 | | |
| 11TaishaV13 | NK001039 | | |
| 12TaishaV13 | VB158597 | | |
| 14TaishaV13 | FR100427 | | |
| 15TaishaV13 | OJ003226 | | |

○ Quant  ● Verbal

Input: F:\Taisha13\NewsestTest13\V.txt    Browse    Print

Search    Exit

Item Find v8.5
Find copyright infringements
Larry Rudner, March 2005 ← 44

GMAC® Item: FR100427 Used 13 times. Most recently: Jul-04, Jan-04, Nov-03, Mar-03

|ACCESSION[FR100427]|PMC

Maize contains the vitamin niacin, but not in a form the body can absorb. Pellagra is a disease that results from niacin deficiency. When maize was introduced into southern Europe from the Americas in the eighteenth century, it quickly became a dietary staple, and many Europeans who came to subsist primarily on maize developed pellagra. Pellagra was virtually unknown at that time in the Americas, however, even among people who subsisted primarily on maize.

Which of the following, if true, most helps to explain the contrasting incidence of pellagra described above?

[BKS[1] Once introduced into southern Europe, maize became popular with land-
  owners because of its high yields relative to other cereal crops. [BKE[1]
 [BKS[1] Maize grown in the Americas contained more niacin than maize grown in Europe did.

14TaishaV13
Maize contains the vitamin niacin, but not in a form the body can absorb. Pellagra is a disease that results from niacin deficiency. When maize was introduced into southern Europe from the Americas in the eighteenth century, it quickly became a dietary staple, and many Europeans who came to subsist primarily on maize developed pellagra. Pellagra was virtually unknown at that time in the Americas, however, even among people who subsisted primarily on maize.

Which of the following, if true, most helps to explain the contrasting incidence of pellagra described above?

A. Once introduced into southern Europe, maize became popular with landowners because of its high yields relative to other cereal crops.

METHOD AND SYSTEM FOR SEARCHING, IDENTIFYING, AND DOCUMENTING INFRINGEMENTS ON COPYRIGHTED INFORMATION

CROSS-REFERENCES TO RELATED APPLICATIONS

Not Applicable.

BACKGROUND OF THE INVENTION

1. Field of the Invention

The present invention relates to a method and system for searching, identifying and documenting infringements on copyrighted information, and in particular to a method and system for searching, identifying and documenting infringements on copyrighted test items, including test items from large scale assessments such as state assessments and admission tests, 2. Background of the Technology Higher education is fast becoming a gateway to securing a good job and success in life. In recent years, the number of applicants applying for graduate schools has increased significantly. In particular, the number of applicants outside the United States interested in applying for schools has risen. As such, more and more applicants are studying and preparing for school admission tests including the Graduate Management Admission Test™ (hereinafter "GMAT®") in an effort to achieve a favorable test score. Having a favorable GMAT® score can increase an applicant's opportunity to be accepted into their graduate school program of their choice.

As a result of the above, the business of preparing and assisting applicants in studying and taking the GMAT® can be a lucrative one. For instance, there are various legitimate study guides an applicant can purchase, and/or legitimate GMAT® preparatory classes an applicant can enroll in. However, there are illegitimate "guides" and "preparatory" classes that offer infringing-copyrighted test questions in different venues including print and the Internet. Specifically, actual GMAT®) items, in whole or in part, are made available to the public without proper authorization.

In view of the above, there is a need for a method and system for identifying and documenting copyrighted test items, such as GMAT® questions, that are illicitly being made available to the public, in order to prepare for possible litigation or criminal prosecution, and in order to identify test items that have been so compromised that they can not longer be used as intended.

SUMMARY OF THE INVENTION

The present invention includes a method for identifying unauthorized use of copyrighted information. The method includes the processes of accessing database files containing copyrighted test items, information to assist in searches, and possibly information about the copyrighted test items; and accepting input, either as a file or as a text string, containing items or parts of items that are suspect of being in violation of the copyrights. In addition, the method includes the processes of determining a result when data within the database of copyrighted items and the input of violation suspects satisfies a predetermined set of logic, storing the results, and exporting the results for future use.

In another embodiment of the present invention, a system for identifying unauthorized use of copyrighted information is disclosed. The system includes positioning the system within a network. Moreover, the system includes a first receiving means for receiving a first input corresponding to a search function with respect to the database of copyrighted items and the database of suspect items or parts of items and a storage unit positioned within the network for storing a result when data within the first database and the second database satisfies a predetermined set of logic.

Additional advantages and novel features of the invention will be set forth in part in the description that follows, and in part will become more apparent to those skilled in the art upon examination of the following or upon learning by practice of the invention.

BRIEF DESCRIPTION OF THE DRAWINGS

The features of the present invention will become more apparent to those of ordinary skill in the art by describing in detail exemplary embodiments thereof with reference to the attached drawings in which:

FIG. 3 shows one example of a graphic user-interface screen that can be implemented with the computer system of the present invention.

DETAILED DESCRIPTION OF THE PREFERRED EMBODIMENT(S)

The exemplary embodiment of the present invention can be implemented in hardware, software, or a combination of both hardware and software and may be implemented in one or more computer systems or other processing systems. In particular, the present exemplary invention can be directed toward one or more computer systems capable of carrying out the functionality described herein or can be in an integrated, modular, and single chip solution and can be embodied on a semiconductor substrate, such as an Application Specific Integrated Circuit (ASIC).

Figure 1:
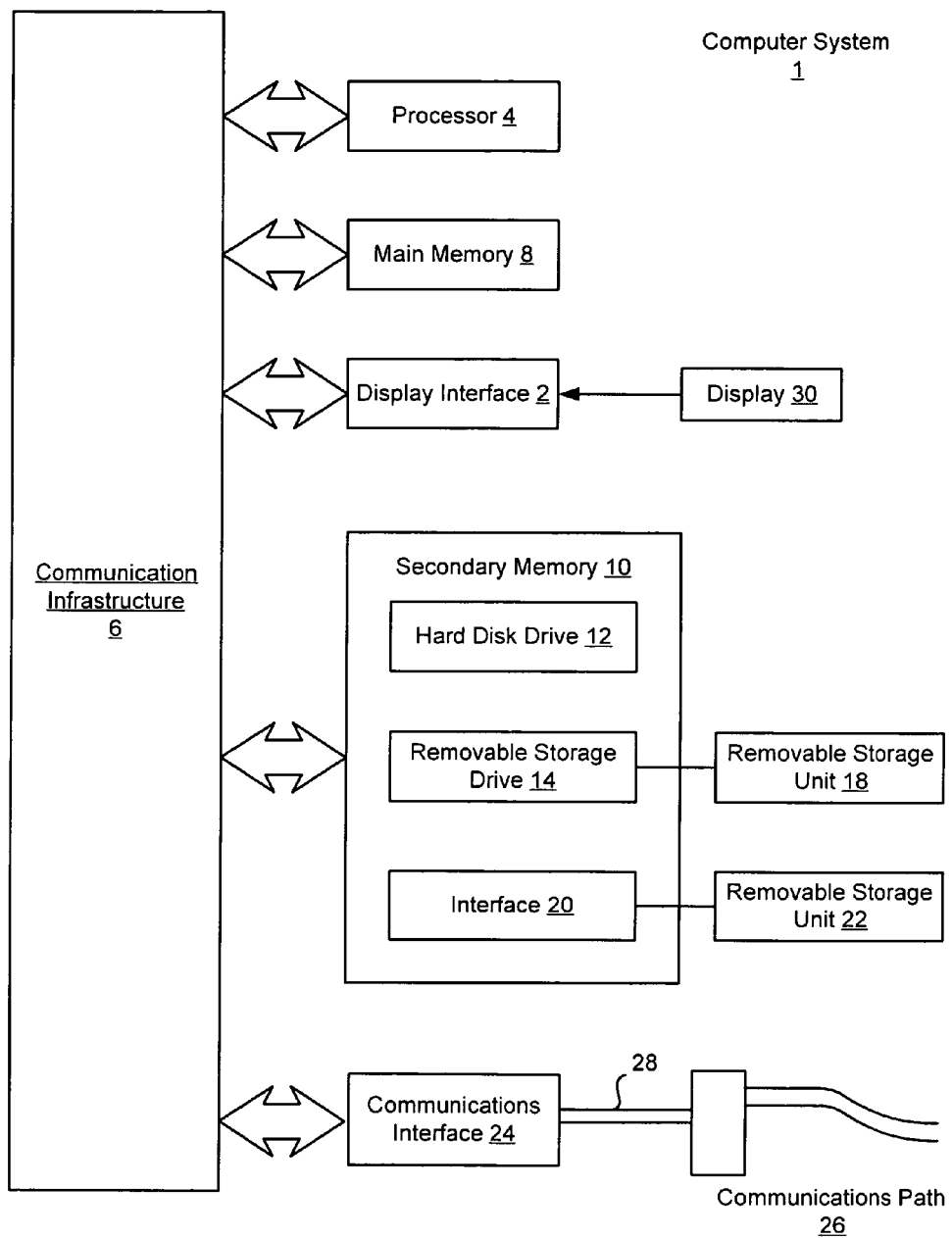
FIG. 1 illustrates a block diagram with various computer system components for use with an exemplary implementation of a clinical decision system, in accordance with one embodiment of the present invention.

FIG. 1 shows a computer system 1 that includes one or more processors, such as processor 4. The processor 4 is connected to a communication infrastructure 6 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 1 can include a display interface 2 that forwards graphics, text, and other data from the communication infrastructure 6 (or from a frame buffer not shown) for display on the display unit 30. Computer system 1 also includes a main memory 8, preferably random access memory (RAM), and may also include a secondary memory 10. The secondary memory 10 may include, for example, a hard disk drive 12 and/or a removable storage drive 14, representing a floppy disk drive, a magnetic tape drive, an optical disk drive, etc. The removable storage drive 14 reads from and/or writes to a removable storage unit 18 in a well known manner. Removable storage unit 18, represents a floppy disk, magnetic tape, optical disk, etc., which is read by and written to removable storage drive 14. As will be appreciated, the removable storage unit 18 includes a computer usable storage medium having stored therein computer software and/or data.

In alternative embodiments, secondary memory 10 may include other similar devices for allowing computer programs or other instructions to be loaded into computer system 1. Such devices may include, for example, a removable storage unit 22 and an interface 20. Examples of such may include a program cartridge and cartridge interface (such as that found in video game devices), a removable memory chip (such as an erasable programmable read only memory (EPROM), or programmable read only memory (PROM)) and associated socket, and other removable storage units 22 and interfaces 20, which allow software and data to be transferred from the removable storage unit 22 to computer system 1.

Computer system 1 may also include a communications interface 24. Communications interface 24 allows software and data to be transferred between computer system 1 and external devices. Examples of communications interface 24 may include a modem, a network interface (such as an Ethernet card), a communications port, a Personal Computer Memory Card International Association (PCMCIA) slot and card, etc. Software and data transferred via communications interface 24 are in the form of signals 28, which may be electronic, electromagnetic, optical or other signals capable of being received by communications interface 24. These signals 28 are provided to communications interface 24 via a communications path (e.g., channel) 26. This path 26 carries signals 28 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 14, a hard disk installed in hard disk drive 12, and signals 28. These computer program products provide software to the computer system 1.

Computer programs (also referred to as computer control logic) are stored in main memory 8 and/or secondary memory 10. Computer programs may also be received via communications interface 24. Such computer programs, when executed, enable the computer system 1 to perform the features of the present invention, as discussed herein. In particular, the computer programs, when executed, enable the processor 4 to perform the features of the present invention. Accordingly, such computer programs represent controllers of the computer system 1.

In an embodiment where the invention is implemented using software, the software may be stored in a computer program product and loaded into computer system 1 using removable storage drive 14, hard drive 12, or communications interface 24. The control logic (software), when executed by the processor 4, causes the processor 4 to perform the functions of the invention as described herein. In another embodiment, the invention is implemented primarily in hardware using, for example, hardware components, such as an ASIC. Implementation of the hardware state machine so as to perform the functions described herein will be apparent to persons skilled in the relevant art(s).

Figure 2:
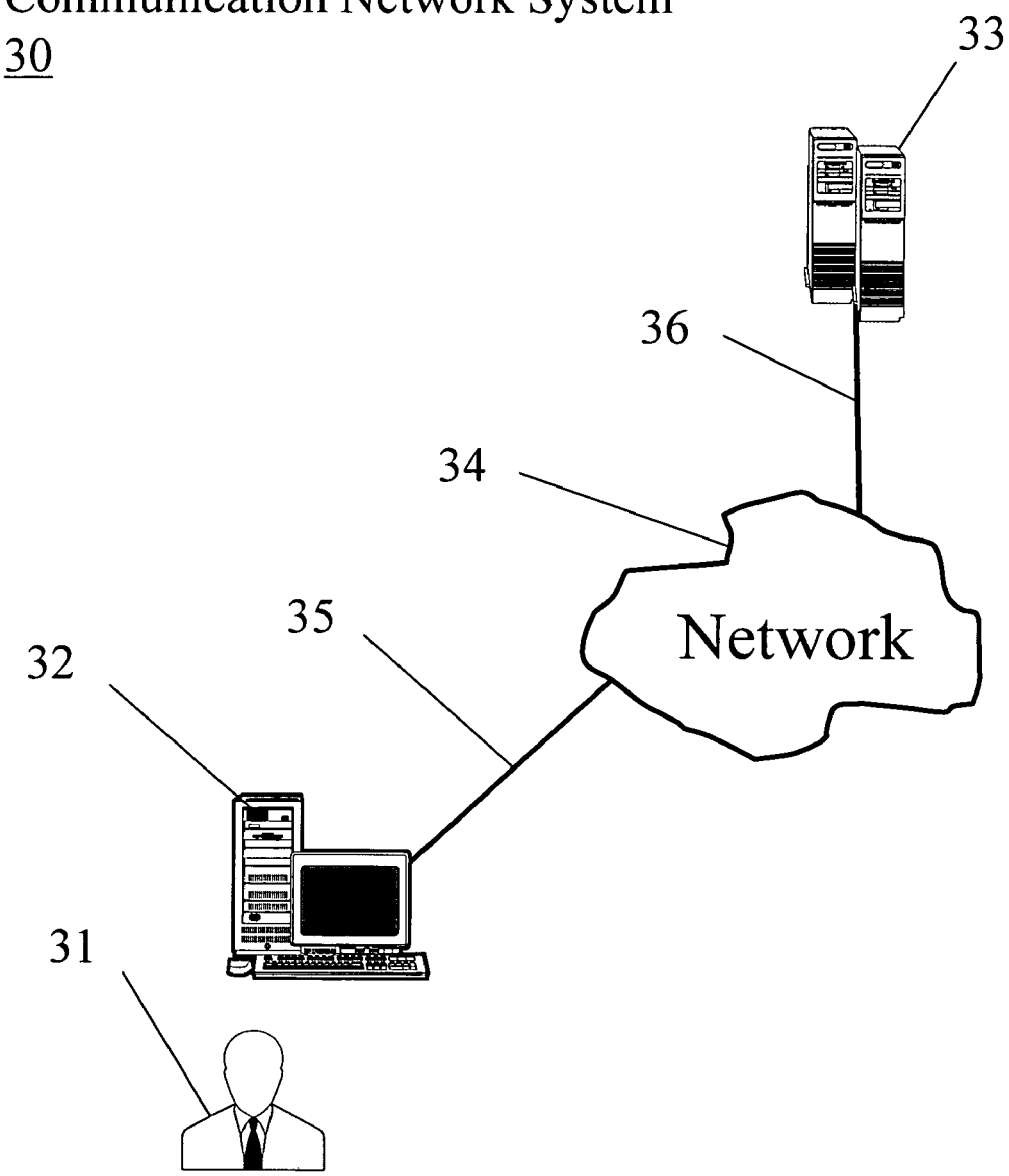
FIG. 2 illustrates one example of a communication network system, in accordance with one embodiment of the present invention.

FIG. 2 shows a communication network system 30 of the present invention for use with the computer system 1 of FIG. 1. The communication system 30 includes an accessor 31 (also referred to interchangeably herein as a "user") and a terminal 32. In one embodiment, data for use in the computer system 1 is, for example, input and/or accessed by the accessor 31 via the terminal 32, such as a personal computer (PC), minicomputer, mainframe computer, microcomputer, telephonic device, or wireless device, such as a hand-held wireless device coupled to a server 33, such as a PC, minicomputer, mainframe computer, microcomputer, or other device having a processor and a repository for data and/or connection to a processor and/or repository for data, via, for example, a network 34, such as the Internet or an intranet, and couplings 35, 36. The couplings 35, 36 include, for example, wired, wireless, or fiberoptic links. In another embodiment, the method and system of the present invention operate in a stand-alone environment, such as on a single terminal.

FIG. 3 illustrates one example of a graphic user-interface screen 40 that can be implemented with the computer system 1 of the present invention. The graphic user-interface screen 40 can include, for example, a search-result display section 41, an option section 42 to select the type of searches to be performed and which of multiple copyrighted databases to use, an input section 43 for accepting searchable files or an input text string, a tools button section 44, and detail item display section 45.

The option section 42 of screen 40 of the present example has a "Quant" option selection and a "Verbal" option selection. Although these two option selections are illustrated in FIG. 3, multiple selection options can appear in section 42. "Quant" can represent the "quantitative" portion of a standardize test such as the GMAT®. Similarly, "Verbal" can represent the "Verbal" portion of a test such as the GMAT®. Another configuration could include a database of released test items and another database of secure test items.

The input section 43 accepts information such as data file(s) to be entered therein. For instance, the data file entered into the input section 43 can be a data file containing potentially infringing test items that are published or made available to the public with authorization from the owner of the copyrighted items. The data file can be locally available in the computer system 1 or can be located remotely on the network 34, for example in server 33. Optionally, the input box can be used to input an item fragment.

In this example, the tools button section 44 includes the "Browse," "Search," "Print," and "Exit" tools. The "Print" button allows printing of a file such a search result or a screen shot. In essence, selecting the "Print" button sends a desired file to the printer for printing a hard copy of the desired information. In addition, the "Exit" button is configured to exit out of the application and into a different application.

Upon entry of a data file or a search string for an item fragment into the input section 43, the "Search" tool or the "Browse" tool can be accessed to initiate a search or a browse with respect to the data file entered. The "Browse" feature first permits the user to identify a file containing suspect items and then examines the copyrighted items database for each item in the file of suspect items. The "Search" feature searches the copyrighted items database for the particular term or phrase entered in section 43. Section 41 displays the item IDs of potential matches in the file of suspect items and the corresponding accession numbers or item identifiers for the copyrighted items in the database. Each item or test question can be identified with a unique identifier, and each item can be a copyrighted item protected under the intellectual property laws of a given jurisdiction. For example, each item can be a copyrighted GMAT® test question protected under the copyright laws of the United States of America. Furthermore, multiple accession numbers can be presented, one for each copyrighted item that appears to have been violated.

By clicking on an Accession number, the user can see a copy of the copyrighted item and the corresponding suspect item found to be in violation of the copyright. The detail item display section 45 of screen 40 includes two panes 45a and 45*b*. The first pane 45*a* displays the actual item such as a copyrighted GMAT® question that was administered in a test. The second pane 45*b* displays the matching item found in the data file entered into the input section 43. Although the present example provides two panes 45*a*, 45*b*, the present invention can provide multiple panes to accommodate various display circumstance. Information about the copyrighted item is presented in section 46. The information in section 46 includes the frequency the item was used, recent dates of use, and in this example the pretest pool identifier which is also the copyright filing identifier. Other relevant item information can be presented.

Figure 4:
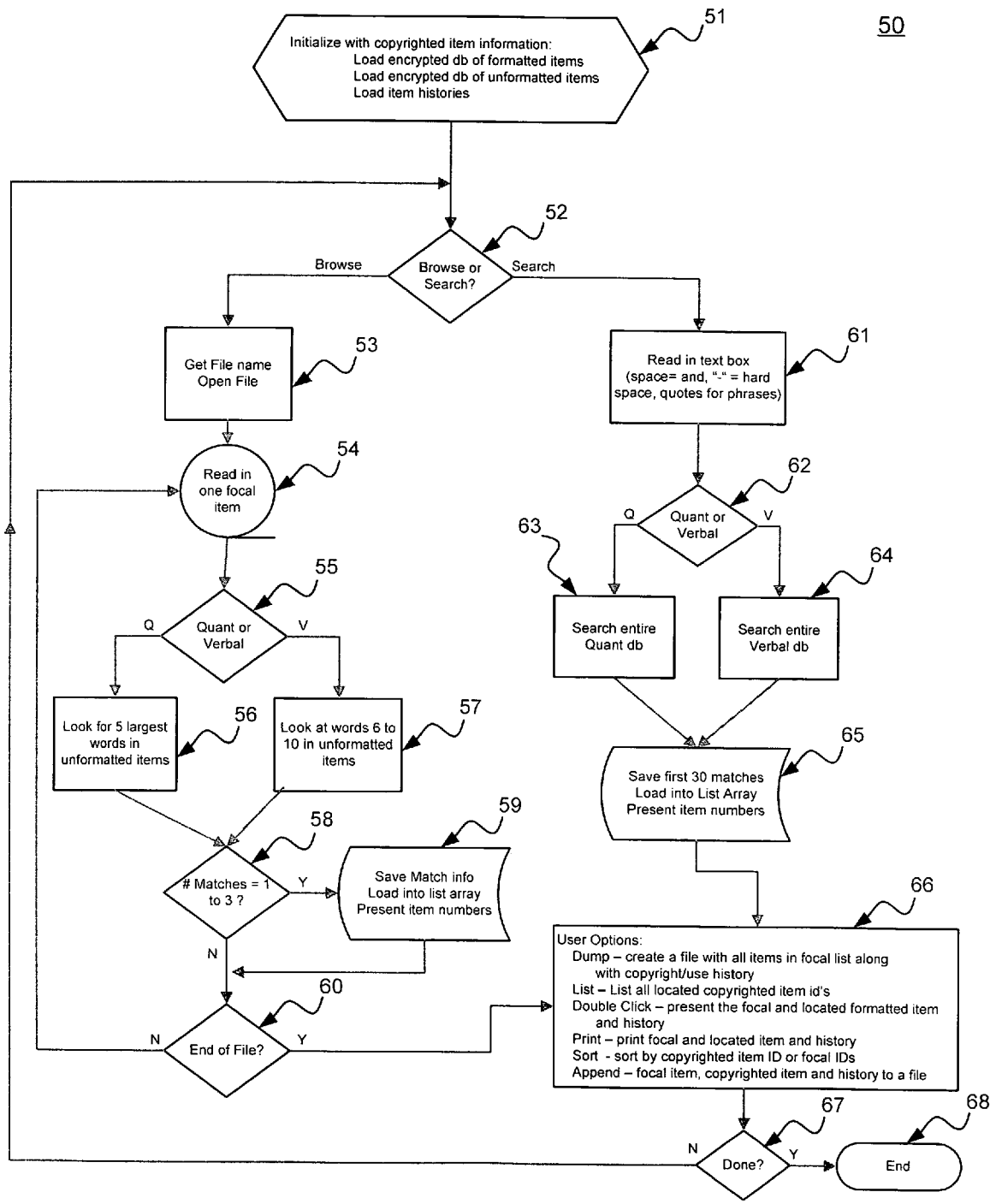
FIG. 4 shows a flow diagram illustrating the methods and processes for searching and identifying items, in according to an exemplary embodiment of the present invention.

FIG. 4 provides a flow diagram 50 illustrating the methods and processes for searching and identifying items such as copyrighted items according to an exemplary embodiment of the present invention.

At step 51, data is initialized. For example, step 51 initializes item information. The item information can be copyrighted items such as copyrighted test questions. The initializing of item information includes loading items, item search indexes, and item histories. Pursuant to the present exemplary embodiment, step 51 loads an encrypted database of formatted test items used for presentation, loads an encrypted database of unformatted items used for searching, and loads the item histories and copyright filing identifiers presented in section 46. However, other embodiments of the present invention can load non-encrypted databases of test items, multiple index files for searching, and a range of information concerning each copyrighted test item.

Once the data is initialized, step 52 provides the user with the options of either the "Browse" or "Search" feature. By selecting the "Browse" feature, the present invention receives an input to initiate the browse feature at step 52. Thereafter, a file name is received and accessed at step 53. The accessed file is also opened at step 53, and at step 54 the present invention receives data information with respect to a set of focal test items suspect of copyright infringement. Sources of sets of test items suspect of copyright infringement include "brain dumps" on the Internet, packages of test preparation materials offered for sale, and digitized versions of seemingly legitimate print publications. The suspect items are read sequentially and one focal item is read and stored in memory, such as a temporary memory, at a time.

After receiving and reading focal item information at step 54, the present invention identifies the database of copyrighted items to be examined based on the option selected in step 55. In the present preferred embodiment, an input at step 55 can be a selection either a "Quant" or a "Verbal" feature. For example, an input of the "Quant" selection informs the system to examine the copyrighted "Quantitative" items of GMAT® and use a particular algorithm for identifying potential infringements. Similarly, an input of the "Verbal" selection can inform the system to examine the copyrighted "Verbal" items of GMAT® using a different algorithm better suited for "Verbal" items.

If an input of "Quant" is received at step 55, the present invention performs a predetermined "Quant" examination algorithm at step 56 based on the data corresponding to the file name in step 53 and the data information with respect to each focal item in the set of suspect items identified in step 53. For instance, the "Quant" examination algorithm in step 56 identifies the five (5) longest character sets (such as words) within a string of character sets in a focal item and determines which, if any, copyrighted items also contain those five (5) longest character sets. However, if an input of "Verbal" is received at step 55, then the present invention performs a predetermined "Verbal" examination algorithm at step 57 based on the data corresponding to the file name in step 53 and the data information with respect to each focal item in the set of focal items identified in step 53. For example, the "Verbal" item examination algorithm in step 57 searches for sequential set of characters positioned within each focal item. In the exemplary embodiment illustrated in FIG. 4, step 57 searches and determines the words that are at the six (6) to ten (10) positions within a string of words, in the unformatted items to yield a result.

Step 58 of FIG. 4 determines if there is a match and the number of matches based on the result performed in steps 56 or 57. For example, step 58 determines the number of matches based on the result performed in steps 56 or 57 and further determines if the number of matches equals to a quantity within a predetermined range such as within the range of one (1) to three (3).

If the number of matches does indeed fall within the predetermined range, then step 59 of the present invention saves the matched information into memory, loads the match information into a list array, and presents the item numbers. The predetermined range minimizes the number of "false positives", i.e. focal items incorrectly flagged as potential copyright infringements. Thereafter, the present invention determines if the end of the file has been reached at step 60.

After determining if the number matches falls within the predetermined range in step 58, step 60 determines if the end of the file has been reached. If step 60 determines that an end of file has not been reached, then the present invention iterates back to step 54 and examines the next focal item in the set of focal items. The system iterates through steps 54 through 59 until the end of file is reached or until a stop command is issued by the user. Once step 60 determines that an end of file has indeed been reached, then the present invention proceeds to step 66 which is discussed in detail below.

As mentioned above, once the data is initialized, step 52 provides the user with the options of either the "Browse" or "Search" feature. By selecting the "Search" feature as an alternative, the present invention receives an input to initiate the search feature at step 52. Thereafter, a search character string is entered into the input section 43 and received at step 61. The search string can comprise of a predetermined Boolean search logic operators. In the exemplary embodiment, a space is the equivalent of a logical "AND," a "-" is the equivalent of a hard space, and a term or phases placed inside a quote ("") is equal to a search for an exact term or the exact phrase within the quote (""). Step 61 provides the user with a wide range of options for manual searches. Unique, non-contiguous strings, words and phrases can be provided in step 61. In a typical investigation, the Search feature is used to manually search for copyright infringements not uncovered by the automated file examination process of the Browse feature.

After receiving and reading the search character string at step 61, the present invention determines which database to use. Similar to above at step 55, an input at step 62 can be a selection either a "Quant" or a "Verbal" database. For example, an input of the "Quant" selection can represent an examination to be conducted for the copyrighted "Quantitative" items of GMAT. Similarly, an input of the "Verbal" selection can represent an instruction to examine the copyrighted "Verbal" items of GMAT.

At step 63 or step 64 the entire selected database is searched for copyrighted items containing the combination of search string text specified in step 61. Once a set of results is obtained in step 63 or 64, step 65 of the present invention saves a predetermined amount of the matched information into memory, loads the match information into a list array, and presents the item numbers.

When the present invention determines that either an end of file has been reached at step 60 or the database search string from step 61 has been completed at step 65, the process proceeds to step 66. At step 66, multiple options such as "Dump," "List," "Double Click," "Print," "Sort" and "Append" are available to the user. When the user selects the "Dump" option, an input is received to initiate the Dump function and processes where the present invention creates a file and stores all the items in the focal list along with the located copyrighted items, item use history, and copyright filing information in the file. The created file can be accessed, opened and edited in order to prepare documentation of copyright infringements. When the user selects the "List" option, an input is received to initiate the List function and processes where the present invention compiles a list of all the searched or browsed items that matched the predetermined parameters, such as the located search or browse copyrighted items and their respective identifiers.

When the user selects the "Double Click" option, an input is similarly received to initiate the "Double Click" function and processes where the present invention shows the "clicked on" copyrighted item, the history and copyright information for that selected item and the associated focal item suspect of copyright infringement. Sections 45 and 46 are updated when the "Double Click" function is evoked.

Furthermore, when selecting the "Print" option, an input is received to print the focal and located item and history, the request to print is sent to a print queue for printing. When selecting the "Sort" option, the present invention receives an input to sort a list of information such as the items. For example, the present invention accesses a file containing a list of information, initiates the sort function with respect to the list of information in the file, and compiles a sorted list of information such as items, based on a predetermined sort requirement. For example, located items can be sorted by copyrighted item identifiers or by focal identifiers. Also, when the "Append" option is selected, an input is received to append information to a designated file. Specifically, the present invention selects the information such as a focal item, and the corresponding copyrighted item and history, copies the information and appends the information to a designated file.

At step 67, the present invention determines if the methods and processes for searching and identifying items are completed. If the user is done with the present invention, then an input is received to end the processes such as exiting out of the system to step 68. However, if the user is not completed with the searching or browsing of the present invention, for example, the present invention commences at step 52.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method of identifying potential unauthorized distribution of copyrighted information, the copyrighted information including (i) copyrighted items, and (ii) a history of use in a test environment of each of the copyrighted items by a copyright owner, the copyrighted items being test questions given to applicants in the test environment, the method comprising:
   (a) providing a database file of the copyrighted information including:
      (i) the copyrighted items, and
      (ii) a history of use in a test environment of each of the copyrighted items by the copyright owner;
   (b) providing a source of items from an entity other than the copyright owner which contains items that are potentially in violation of the copyrighted items;
   (c) automatically comparing in a computer the copyrighted items in the database file of copyrighted information with the items in the source of items, and identifying any items in the source of items that are potentially in violation of a copyrighted item due to similarities with the copyrighted items; and
   (d) displaying the identified items in association with the copyrighted items that are potentially being violated and the history of use in a test environment of each of the copyrighted items by the copyright owner that are potentially being violated.

2. The method of claim 1 wherein the history of use of the copyrighted items in a test environment includes a total number of times that the item has appeared in previously given tests.

3. The method of claim 1 wherein the history of use of the copyrighted items in a test environment includes most recently given tests that the item has appeared in.

4. The method of claim 1 wherein step (c) is performed using at least one examination algorithm.

5. The method of claim 4 wherein one of the examination algorithms identifies the five longest character sets within a string of character sets in an item in the source of items and determines which, if any, copyrighted items also contain those five longest character sets.

6. The method of claim 4 wherein one of the examination algorithms searches for a sequential set of characters positioned within each item in the source of items and determines which, if any, copyrighted items also contain the sequential set of characters.

7. The method of claim 4 wherein one of the examination algorithms identifies keywords based on word length.

8. The method of claim 1 wherein if step (c) identifies a plurality of copyrighted items that are potentially violated by an item in the source of items, then step (d) displays the plurality of copyrighted items in association with the item in the source of items.

9. The method of claim 8 wherein step (d) includes displaying identification numbers for the identified items and the copyrighted items.

10. The method of claim 1 wherein the copyrighted information further includes copyright filing information of each of the copyrighted items and step (d) further includes displaying the copyright filing information of the copyrighted items that are potentially being violated.

11. The method of claim 1 wherein step (d) includes displaying identification numbers for the identified items and the copyrighted items.

12. The method of claim 1 wherein the displaying in step (d) occurs by printing the identified items in association with the copyrighted items that are potentially being violated and the history of use of the copyrighted items that are potentially being violated.

13. The method of claim 1 wherein step (c) is performed by automatically comparing in a computer a search character string that is present in a selected copyrighted item in the database file of copyrighted information with search character strings in the items in the source of items, and identifying any items in the source of items that are potentially in violation of the selected copyrighted item due to the presence of similar search character strings.

\* \* \* \* \*